3,141,024
N-(3,4,5-TRIMETHOXY BENZOYL AMINO ACETYL)PYRROLIDINE

Jean-Marie Alfred Houssin, Enghien-les-Bains, France, assignor to Compagnie Francaise des Matieres Colorantes, Paris, France
No Drawing. Filed Apr. 30, 1962, Ser. No. 191,269
Claims priority, application France May 2, 1961
1 Claim. (Cl. 260—326.3)

The present invention relates to a compound having properties which make it suitable as an analgesic medicine.

It has been found according to the present invention that the amide derived from 3',4',5'-trimethoxy-benzoylglycine (3',4',5' - trimethoxy - benzoylaminoacetic acid), and pyrrolidine, possesses interesting analgesic, antipyretic and antiphlogistic properties. This compound has the formula:

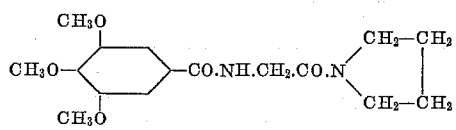

It may be administered, for example, in the form of tablets containing 0.40 g. to 0.50 g. of the amide. It forms beautiful white shining scales; it is insoluble in cold water and in olive oil and can be recrystallized from a mixture of ethyl acetate and ethyl ether. Its melting point is 111° C., taken in a capillary tube.

The amide of the present invention may be prepared by reacting 3,4,5-benzoylglycine with acetic anhydride at elevated temperature from 80° C. to 100° C. to produce 3',4',5' - trimethoxy - 2 - phenyl - 5 - oxazolone; reacting said 3',4',5' - trimethoxy - 2 - phenyl - 5 - oxazolone with pyrrolidine at a temperature below 50° C. in an inert solvent, removing the inert solvent from the crystallized product, treating said crystallized product with an alkali and recovering the resultant pyrrolidide of 3',4',5'-trimethoxybenzoylaminoacetic acid.

The preparation of the amide of the present invention will be illustrated by way of the following example.

(a) *Preparation of 3',4',5'-Trimethoxy-2-Phenyl-5-Oxazolone*

265 parts by weight of 3,4,5 - trimethoxy-benzoylglycine are placed in an apparatus provided with a mechanical stirrer, a thermometer and a condenser, and 795 parts by weight of acetic anhydride previously heated to 125° C. are added while stirring, the apparatus being heated to maintain the temperature at between 80° C. and 100° C. In 4 to 6 minutes a yellow solution is obtained which is rapidly cooled and 2780 parts of dry isopropyl ether added thereto. The mixture is filtered, the solid washed with isopropyl ether and dried under vacuum until its weight is constant. 190 parts of 3',4',5'-trimethoxy-2-phenyl-5-oxazolone of melting point 126° C. (yield 76.90%) are thus obtained. The product may be purified by recrystallization from 4 parts of ethyl acetate; the melting point is then 126–127° C.

*Analysis.*—Calculated for $C_{12}H_{13}NO_5$: C%, 57.37; H%, 5.21; N%, 5.57. Found: C%, 57.46; H%, 5.42; N%, 5.32.

(b) *Preparation of the Pyrrolidide of 3',4',5'-Trimethoxybenzoylaminoacetic Acid*

378 parts by weight of 3',4',5'-trimethoxy-2-phenyl-5-oxazolone and 756 parts of toluene are placed in an apparatus provided with a mechanical stirrer and a thermometer, and to the suspension thus obtained are added in a fine stream and with stirring 135 parts by weight of pyrrolidine, care being taken to maintain the temperature inside the apparatus below 50° C. The mixture is stirred until crystallization takes place and the solvent is removed by distillation under reduced pressure. The residue is treated with 725 parts by weight of normal caustic soda. The precipitate is filtered off and washed with water until the washings are no longer alkaline. 377 parts by weight of the pyrrolidide of the 3',4',5' - trimethoxy - benzoylaminoacetic acid are obtained, i.e., a yield of 78%. The melting point of the product is 108° C. In order to purify the product, 807 parts by weight thereof are dissolved in 2400 parts by weight of hot ethyl acetate; decolorizing charcoal is added and it is filtered. 1500 parts of isopropyl ether are added to the filtrate and after filtration and drying, 695 parts of a product of melting point 109° C. are obtained. The product crystallizes with one molecule of water.

*Analysis for* $C_{16}H_{22}N_2O_5.H_2O$.—Mol. wt. 340.37. Calculated: C%, 56.45; H%, 7.10; N%, 8.23; $H_2O$%, 5.29. Found: C%, 56.69; H%, 7.03; N%, 8.42; $H_2O$%, 5.58.

Pharmacological Property

This amide compound of the present invention has only slight toxicity: the lethal dose 50 taken orally in the case of mouse C 57 black is 2.3 g./kg. The maximum non-toxic dose under the same conditions is 1 g./kg.

Taken orally by the animal, this substance brings about a series of pharmacodynamic effects which enable it to be characterized as a remarkable analgesic, antipyretic and antiphlogistic.

The estimation of the analgesic activity has been made on the mouse by the hot plate test. With a dose of 750 mg./kg., taken orally, there is thus obtained one hour after ingestion an increase in the reaction time, which changes from 4.8 seconds in the case of the control experiments to 25.5 seconds on the average; in fact three-quarters of the animals are yet unsensitized after 30 seconds. The percentage of analgesia is fixed at 555. At a dose of 500 mg./kg. the effects of the product are always very important, since the percentage of analgesia is 319. For anoral dose of 250 mg./kg. it is maintained at 127.

The action of the amide of the present invention as an antipyretic has also been studied by measuring the rectal temperature of the mice treated. The compound administered orally at a dose of 750 mg./kg. causes a lowering of the rectal temperature of about 5° C., the effect becoming evident 30 minutes to 1 hour after the administration of the product.

These pharmacodynamic actions have been completed by a study of the central effects, in particular at the level of the third thalamocortical neurone, and by spinal effects. They have been revealed by tests of protection against convulsions with fatal results started by agents such as pentetrazole, which stimulates neuraxis at all spinal levels, and picrotoxin, the actions of which at bulbar and cortical levels are known. The compound of the above formula, administered orally in a dose of 750 mg./kg., reduces by 60% the mortality caused by the pentetrazole, by 40% that due to the picrotoxin, and by 70% that caused by caffeine (80 mg./kg. of caffeine benzoate administered intravenously). Nevertheless these effects do not reach the sleep centres and show that the depressive action observed with the other tests does not enable this body to approach the hypnotics.

Tests on the study of behaviour, such as those of the sleep reflex, the pinching reflex, the Preyer reflex and the Courvoisier test are practically completely negative. At most a slight sedative action shown by the turning rod test can be noted.

In conclusion, it may be stated that the compound of the above formula has no narcotic action, that it does not cause sleep in the case of animals and that it leaves the cortical layer practically intact.

The analgesic and antithermic actions of the amine product of the present invention have led to the study of other properties of this compound especially the antiphlogistic effects. With this object a series of tests has been carried out to measure the inflammation resulting from hypodermic injection, under the plantar arch of the mouse, of 5-hydroxytryptamine (in a dose of 25γ). The results of these tests show that the 5-hydroxytryptamine oedema, when it is started 3 hours after the injection of the compound, is lower than the control by 16%.

*Examples of Therapeutic Applications*

(1) The above product has been administered to 15 patients who have received 4 cachets per day of 0.50 g. of product, one before each of the three meals and one at bedtime, this procedure being followed for 6 days in most of the cases.

These patients can be arranged in 3 categories:

5 patients show painful pelvic syndromes.
5 patients show painful syndromes of the head, neck or shoulders.
5 patients show painful digestive syndromes.

No intolerance and no hypnotic action has been observed.

Altogether, the results have been very satisfactory. From the curative point of view the pains have been either abolished or greatly diminished and of much shorter duration, and if they reappear later, they have come at much longer intervals.

For some of these patients a preventive treatment has been tried of a dose of 2 cachets per day of 0.50 g. of product; the crises are either shortened or abolished.

(2) The product has been administered to 10 other patients operated on with a painful anal syndrome: haemorrhoids or fissures (5 cases) or with a surgical intervention: 2 gatractomies, 1 rectal blister and 2 laparoscopies. In all of these patients the postoperative pain has been considerably reduced after only 2 to 4 days of treatment (3 cachets containing 0.50 g. of product).

I claim:

A compound of the formula

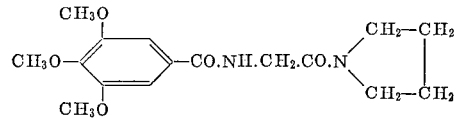

References Cited in the file of this patent

UNITED STATES PATENTS

| | | |
|---|---|---|
| 2,829,146 | Beaver | Apr. 1, 1958 |
| 2,901,486 | Allen | Aug. 25, 1959 |
| 3,004,889 | Kuna | Oct. 17, 1961 |
| 3,036,954 | Robbins | May 29, 1962 |

OTHER REFERENCES

Rodd: "Chemistry of Carbon Compounds," vol. IV–A, page 366 (1957).